UNITED STATES PATENT OFFICE.

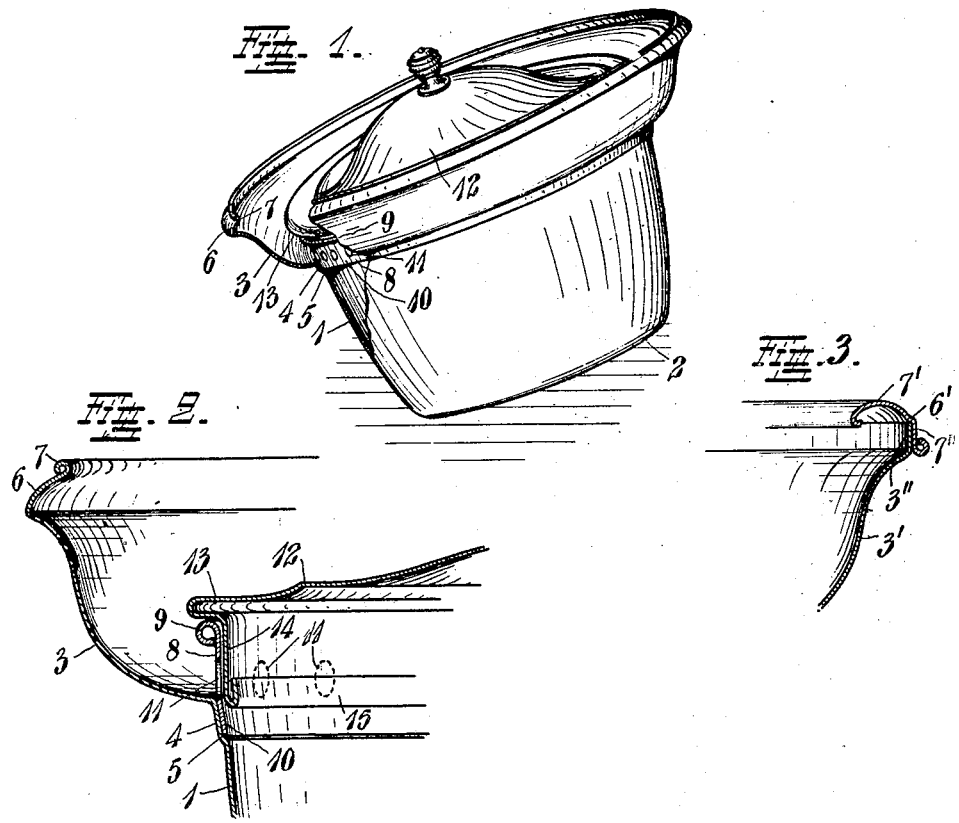

HENRY W. ZIMMERMANN, OF CINCINNATI, OHIO, ASSIGNOR TO BADGER METAL WARE COMPANY, OF MILWAUKEE, WISCONSIN, A CORPORATION OF WISCONSIN.

BOILER.

1,371,718.  Specification of Letters Patent.  Patented Mar. 15, 1921.

Application filed February 3, 1919. Serial No. 274,672.

*To all whom it may concern:*

Be it known that I, HENRY W. ZIMMERMANN, residing at Cincinnati, in the county of Hamilton and State of Ohio, have invented certain new and useful Improvements in Boilers, of which the following is a specification.

My invention relates to cooking vessels and the like, and its object is to increase the reliability, efficiency and convenience of use of such devices, as well as to provide for producing them economically.

My invention consists in the combination of parts and in the details of construction and arrangement of parts as will hereinafter be more fully described and claimed.

In the drawings:

Figure 1 is a general perspective view of a cooking vessel embodying my invention, the vessel being represented as having part of its side broken away to more clearly show its construction;

Fig. 2 is a partial cross-section of the vessel and its lid; and

Fig. 3 is a similar section showing a modification.

For the purpose of illustrating my invention, I show a pot or kettle, such as is used in boiling or stewing, as being a boiler or vessel to which my invention is applicable.

This vessel or boiler comprises the lower main circular body part 1 which, like many other vessels of a similar character, increases in diameter from its bottom 2 upward. Its sides and bottom are preferably integral. This vessel differs from others, however, in having attached to its upper part a rather widely flaring rim 3. This rim also is preferably integral with the main part 1. The junction 4 of this rim 3 with the main part 1 is a slight enlargement of the main part 1 which leaves an internal annular shoulder or ledge 5 in the vessel some distance below where the rim 3 extends abruptly radially outwardly. Preferably, the cross-section of this rim 3 at any point has the radially outward and slightly upward extension from the junction part 4 succeeded by a more decided upward curvature which then merges into a radially outward curvature near the top of the rim. Succeeding this last curvature and joining this upper part of the rim almost at right angles so that it inclines inwardly all around, is the barrier 6. This barrier 6 preferably has the outwardly and downwardly turned bead 7 all around its upper edge, which thus constitutes the extreme upper edge of the vessel rim.

The inner rim 8 is of relatively very short cylindrical formation, preferably having formed around its upper edge the outwardly and downwardly turned bead 9. Its lower edge is left plain and is designed to be fitted tightly into the annular junction part 4 of the vessel 1 with this lower edge coming against the interior annular shoulder 5 to facilitate the tight fitting of this inner rim 8 to the vessel 1. The junction part 4 is preferably slightly radially outwardly inclined upwardly from the shoulder 5 all around the vessel, and the lower edge part 10 of the inner rim 8 is correspondingly inclined so that it is adapted to wedge tightly in the junction part 4 and against the shoulder 5. This inner rim 8 has perforations 11 at intervals therearound, and preferably at such a height that when the inner rim 8 is fitted in the vessel 1, as just described, the lowermost points of these perforations will substantially coincide with the abrupt extension of the rim 3 from the part 4.

The lid or cover 12 in its main part is of usual formation, but has its edge part turned downward and inward all around, forming a flange 13; and extending down from the inwardly turned part of the flange 13 and preferably integral therewith is the upright shell 14 which preferably has its lower edge part 15 turned up to strengthen the lower part of the shell and form a smooth lower edge thereon in a well-known manner. This shell 14 extending downward from the flange 13 all around the cover 12 in this manner is of such diameter that it will fit snugly down inside the inner rim 8 with the lower side of the flange 13 coming against the top of the bead 9 of said inner rim 8. The downward extent of the shell 14 of the lid or cover 12 is such that when this lid or cover 12 is pressed as far down as is permitted by the engagement of the flange 13 with the bead 9, the shell 14 will cover the perforations 11 in the inner rim 8.

With the cover thus fitting the vessel, the steam will accumulate inside the vessel under the cover or lid 12 incident to the cooking, boiling, stewing or other operation. Then, when there is an excessive rate of such operation, such as would in the ordinary vessel result in "boiling over", the excessive steam pressure will raise the lid or cover 12 until its shell 14 uncovers the perforations 11; whereupon some of the steam and some of the boiling water or other liquid will escape through these perforations into the trough constituted by the rim 3. This rim or trough 3 is high enough to accommodate the outflowing liquid in most instances. As is well known, these "boiling over" conditions are usually only temporary; and when the condition ceases, the liquid immediately flows from the trough or rim 3 back through the perforations into the main part 1 of the vessel, and the lid or cover 12 descends and closes the perforations 11, as permitted by the falling steam pressure inside the vessel.

With this construction, the boiling, cooking, stewing or other operation is carried on with the best advantage, because for most of the time the steam is confined to the vessel, thus conserving fuel. Where the vessel is used in preparing food-stuffs, this confining of the steam also results in better retaining the flavor of the food-stuff. While thus having the highly desirable efficiency of a closely covered boiling or cooking vessel, it does not require constant watching as with an ordinary vessel kept tightly covered. Broadly, this construction so far described is the same as that disclosed in my Patent No. 1,291,347, dated January 14, 1919, and is claimed therein.

The present construction differs specifically from that shown in said patent in having the main part 1 and the rim 3 formed together, while the inner rim 8 is formed separately and is preferably detachable from the parts 1 and 3. This permits more convenient and thorough cleaning of the device than where such parts as the main part 1, rim 3 and inner rim 8 are permanently attached together, leaving a sharp angle at the junction of the rim 3 with the inner rim 8. However, even if the inner rim 8 is permanently fastened to the other parts, the formation of the main part 1 and rim 3 of a single piece is an advantage in some respects, because it is more convenient to insert or fasten the inner rim 8 inside these parts 1 and 3 than to secure a separate rim or trough 3 to the outside of the inner rim 8 and main part 1, where these latter two parts are fastened together or formed integral. It will be understood, however, that any of these parts may be made separately and fastened together, or left separable, as may be desired.

The inwardly turned barrier 6 at the top of the rim 3 constitutes another difference from the device disclosed in the aforesaid patent. Its function is to obstruct overflow of any greatly excessive amount of liquid that might escape through the perforations 11 in the manner hereinbefore described, as might be the case upon very excessive overheating of the vessel, or, in cooking or boiling certain substances. For instance, in the boiling of soap there is frequent excessive overflow or "boiling over." This inturned barrier 6 or a similarly related part fends the liquid inwardly and downwardly where it will return to the lower part of the trough or rim 3 or will be thrown onto the top of the lid or cover 12 from which it will readily flow back into the trough or rim 3.

In the example of Fig. 3 the barrier 6' is detachable, to facilitate cleaning of the vessel and the barrier. It comprises the main upper part 7' inwardly extending and of arched cross-section, and the lower vertical part 7" fitting around the vertical part 3" of the rim 3' of the vessel 1'. Also, this example shows the downward inward beading of the barrier 6' at its inner edge of its part 6", which in some cases more effectively deflects overflow back into the lower part of the trough or rim 3'.

While certain constructional details are deemed preferable in connection with my invention, and I have shown and described these rather specifically in elucidating the construction and use of my invention, as is required, I do not wish to be understood as being limited to such precise showing and description, but having thus fully described my invention, what I claim as new and desire to secure by Letters Patent is:

1. In a boiler or the like, a container to contain liquid for boiling, having a wall with an opening therethrough, a trough outside said wall to catch said liquid coming from said container and return said liquid to said container through said opening, a barrier on the rim of said trough to obstruct overflow of said liquid from said trough, and a cover for said container having a part fitting down across said opening, said cover being adapted to be forced up to withdraw said part from said opening.

2. In a boiler or the like, a container comprising a main lower part having a bottom, and an outwardly and upwardly extended outer rim attached to said main part, and an inner rim having a tapered lower part, the junction of said main part and said outer rim being flared upwardly, and said tapered lower part of said inner rim being adapted to wedge in this upwardly flared junction, whereby said outer rim constitutes a trough around adjacent to said inner rim.

3. In a boiler or the like, a container comprising a main lower part having a bottom, and an outwardly and upwardly extended outer rim integral with said main part, and an inner rim having a downwardly tapered lower part, the junction of said main part with said outer rim being flared upwardly, and said tapered lower part of said inner rim being adapted to wedge in this junction, whereby said outer rim constitutes a trough around next to said inner rim.

4. In a boiler or the like, a container comprising a main lower part having a bottom, and an outwardly and upwardly extended outer rim integral with said main part, the junction of said outer rim and main part being offset outwardly from said main part, whereby an internal annular upwardly facing shoulder is formed in said main part, and an inner rim fitting down in this junction with its lower edge against said shoulder, whereby said outer rim constitutes a trough around adjacent to said inner rim.

5. In a boiler or the like, a container comprising a main lower part having a bottom, and an outwardly and upwardly extended outer rim integral with said main part, the junction of said outer rim with said main part being offset outwardly from said main part whereby an internal annular upwardly facing shoulder is formed, and said junction flaring upwardly from this shoulder, and an inner rim having its lower part downwardly tapered and wedging in said upwardly flaring junction with the lower edge of said inner rim against said shoulder, whereby said outer rim constitutes a trough around adjacent to said inner rim.

HENRY W. ZIMMERMANN.

Witnesses:
JAMES N. RAMSEY,
CLARENCE PERDEW.